United States Patent [19]

Walrave

[11] 4,128,933
[45] Dec. 12, 1978

[54] PROCESS OF MAKING METALLIC NON-SKID STUDS FOR TIRES

[75] Inventor: Jean Walrave, Meylan, France

[73] Assignee: Eurotungstene, Grenoble, France

[21] Appl. No.: 851,687

[22] Filed: Nov. 15, 1977

[30] Foreign Application Priority Data

Nov. 17, 1976 [FR] France .................................. 76 35288

[51] Int. Cl.² ............................................... B22F 5/00
[52] U.S. Cl. .................................. 29/420.5; 29/159.1; 29/525; 29/434
[58] Field of Search ..................... 29/159.1, 420, 420.5, 29/434, 505, 525; 152/210

[56] References Cited

U.S. PATENT DOCUMENTS

| | | | |
|---|---|---|---|
| 3,196,921 | 7/1965 | Hakka | 152/210 |
| 3,220,455 | 11/1965 | Sowko | 152/210 |
| 3,408,730 | 11/1968 | Anderson | 29/505 |
| 3,680,195 | 8/1972 | Lejdegard | 29/505 X |
| 3,719,478 | 3/1973 | Cantz | 152/210 X |
| 3,811,877 | 5/1974 | Hakka | 29/525 X |
| 3,837,386 | 9/1974 | Lejeune | 152/210 |
| 4,059,879 | 11/1977 | Chmura et al. | 29/420.5 X |

*Primary Examiner*—Michael J. Keenan
*Attorney, Agent, or Firm*—Dennison, Dennison, Meserole & Pollack

[57] ABSTRACT

The invention relates to a process of making small diameter non-skid metallic studs, for tires, composed of a hard material small rod and of a metallic sheath having an elongated longitudinal axis. The sheath includes a fitting or mounting socket for the small rod, at least one small anchoring collar, and a narrowed intermediate section of smaller diameter than the lower and upper adjacent sections. The process comprises forming a sintered rough shaped sheath of at least 85% of theoretical or maximum density which sheath includes the rod's fitting; introducing the small rod in its fitting, leaving an empty space less than 0.6 mm between the rod and the fitting's base; and bringing the sheath to its final shape through trimming or rolling, in particular, in the narrowed section, while holding tightly the sheath's section surrounding the small rod.

5 Claims, 7 Drawing Figures

PROCESS OF MAKING METALLIC NON-SKID STUDS FOR TIRES

This invention relates to a process of making metallic non-skid studs for tires.

We know that such studs are generally made out of a sheath of cylindrical or truncated cone form with a longitudinal axis and including one or more small collars to facilitate the anchoring of the studs in the tire's tread to hold its position. The sheath further includes a mounting socket, of cylindrical or truncated cone shape for example, in which is fitted a hard material rod, usually of tungsten carbide. The small rod is oriented to contact the road.

These studs are made in two ways. The first technique starts with a small piece of cylindrical metal, steel for example, in which the rod's mounting socket is machine finished and the sheath collars are formed by a trimming out process. This technique provides studs of any shape, but at a high cost because of the number of steps involved and the significant loss of metal for certain shapes.

For this reason it was proposed to make sintered studs by using the techniques of powder metallurgy, starting, for example, from forming by compressing or by cold stamping a steel powder. In this manner the desired shape was acquired directly, including the rod's mounting socket or fitting, with practically no metal loss. On the other hand, this process does not allow the making of all desired shapes.

In particular, we cannot make studs by sintering which show a narrow diametric section smaller than lower and upper adjacent sections. Such situations include studs with one collar having a groove therebelow with a smaller diameter than the rest of the sheath, or double collar studs. In fact, because the homogenous compression of the powder and the taking from the mold after sintering becomes practically impossible for such shapes, we are compelled to make it by trimming. Likewise, the cold stamping does not allow significant change of dimensions.

But, those shapes are becoming more and more necessary, in particular for studs of small diameter (6 to 7 mm) which allow a minimum wear of the road's surface, and which then could avoid prohibitions normally set by public authorities.

In addition, the usual technique of making studs consists in fitting the hard textured small rod in its fitting or mounting socket with a free space of at least 2 mm between the inside end of the rod and the fitting's base in order to allow the gradual knocking or driving in of the rod in its sheath when driving.

However, tests made have shown that this traditional setting was quite inappropriate for the small diameter studs contemplated herein because the driving in of the rod in relation to the tire's surface quickly becomes too significant. The stud then loses its efficiency and the vehicle's safety is compromised.

The aim of this invention is to make studs composed of one or several collars and a narrowed section between two adjacent sections of bigger diameter. The net cost would be much less than that obtained by machine finishing.

Another aim of the invention is to make small diameter studs (6 to 7 mm) giving an excellent stability to the protruding carbide small rod during its use.

According to the invention the process consists of:

(a) providing a rough shaped sheath including a small rod fitting or mounting socket;

(b) introducing the hard textured rod in its fitting with a free space lower than 0.6 mm between the end of the rod and the base of the fitting; and (c) trimming out or rolling down the sheath into its final shape, in particular at its narrow section, while holding the sheath in a clamp about the lower section surrounding the small rod.

The sheath's rough shaping can be realized by the sintering of a compressed metallic powder having at least 85% of the theoretical density.

The rough shaping, including the forming of the rod's filling, can also be made by any other means, without metal loss, as by cold stamping for example.

The invention will be better understood from the detailed description referring to the accompanying drawings.

Figure 1:
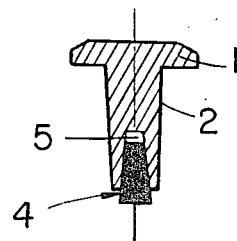
FIG. 1 shows a side view in longitudinal cross-section of a traditional stud with simple collar wherein the sheath can be made by sintering or cold stamping.

The stud of FIG. 1 includes a collar 1 to be anchored in the tire's tread and a cylindrical stem 2 with a fitting or mounting socket 3 which receives a small carbide rod 4. The rod 4 is forcefully driven in the fitting with a free space 5 between the end of the small rod and the fitting base of at least 2 mm. This fitting, as an example, can be cylindrical or truncated cone shaped. The small rod will have a similar or slightly different shape to better assure its stability in the fitting.

Such studs can easily be made by powder metallurgy techniques without particular machine finishing, or cold stamping.

Figure 4:
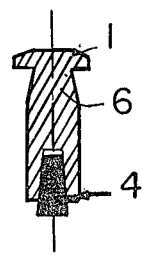

On the other hand, the stud shown in FIG. 4 includes a narrowed section 6 forming a groove under the collar. This shape cannot be made through powder metallurgy nor by cold stamping because of the change of dimensions, particularly for small diameter studs (6 to 7 mm), because the homogeneous compression and the taking from the mold would be difficult to do and the obtained stud would be very fragile. Of course, this shape can be acquired through trimming from steel cylindrical material of the same diameter as the collar. It would also be necessary to machine finish the fitting 3 and, as will be appreciated, the loss of metal would be significant.

Figure 2:
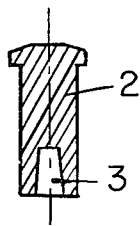
FIGS. 2, 3 and 4 show, in order, an axial sectional view of the rough shaped sheath; the rough shaped sheath after mounting of the hard textured rod; and the final form of a single collar stud with a narrowed section made through the process of the invention.

By following the invention's steps, we make a rough shape composed of a collar 1 and a stem 2 drilled for a fitting 3 as shown in FIG. 2.

Figure 3:
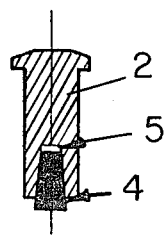

We then place the small rod 4 in its fitting 3 with a free space less than 0.6 mm between the end of the rod and the very narrow fitting base, preferably between 0.3 and 0.5 mm as shown by FIG. 3.

We then grip the sheath's section surrounding the small rod 4 in a clamp mounted on the trimming lathe or rolling machine and we machine the groove 6 to the final dimension.

In order that the trimming process be done properly, it is necessary that the rough shape, if sintered, be sufficiently dense. In practice if the density is greater than % of theoretical density, it is enough. If necessary we also over densify the sections near the sections to trimmed.

Figure 7:
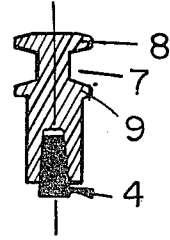

The introduction of the small rod in its fitting or mounting socket before the trimming process avoids a deformation of the fitting at the time it is tightened in the clamp. Any deformation would prevent a precise seating of the carbide rod's fitting. It is also possible to provide a double collar stud shown in FIG. 7 which is workable either through powder metallurgy or cold stamping because of a narrowed section 7 between the two collars 8 and 9.

Figure 5:
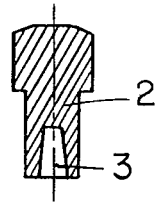
FIGS. 5, 6 and 7 show, in order, an axial sectional view of the rough shaped sheath; the rough shaped sheath after mounting of the small rod; and the final shape of a double collar stud according to the invention.
Figure 6:
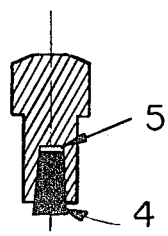

First a rough shaped configuration is made as shown FIG. 5, including the first cylindrical section of equal diameter with the largest diameter of the collars 8 and 9 and a second cylindrical section having the final diameter of the sheath's lower section and a formed fitting or mounting socket 3 for the small rod 4.

Next the rod is introduced into the fitting 3 with an empty space of between 0.3 to 0.5 mm between the rod and the fitting's base.

The sheath's lower section is then secured in a clamp and the larger cylindrical section trimmed or rolled to form the two collars 8 and 9.

With the above process, the net cost is significantly lowered in comparison to a steel stud entirely trimmed. At the same time a stud wherein the protruding carbide rod will quickly stabilize itself at a given level during the whole usage period results.

I claim:

1. The method of making metallic studs for vehicle tires wherein the finished stud is composed of a sintered sheath shaped to provide at least one anchoring collar adjacent one end, an intermediate portion of reduced diameter, and a socket portion of predetermined depth at the opposite end within which an insert of hardened material is partially disposed, comprising the steps of:
    (1) forming the socketed sintered sheath in a preliminary configuration;
    (2) introducing by cold pressing said hardened insert partially into said socket to define an unoccupied zone in said socket not in excess of 0.5 mm in depth between the inserted end of said insert and the base of said socket;
    (3) holding the section of said sheath surrounding said insert, and
    (4) shaping at least a portion of said unsupported sheath to final form.

2. The process of claim 1 wherein an empty space of between 0.3 and 0.5 mm is left between the rod and the mounting socket base.

3. The process of claim 1 wherein said final shaping step is accomplished by machining.

4. The process of claim 1 wherein said final shaping is accomplished by rolling.

5. The process of claim 1 wherein the sintered sheath in the preliminary configuration has a density of at least about 85% of the theoretical density.

* * * * *